United States Patent
Boettner et al.

(10) Patent No.: US 8,373,575 B2
(45) Date of Patent: Feb. 12, 2013

(54) SERVICE DEPENDENCY NOTIFICATION SYSTEM

(75) Inventors: Fred Henry Boettner, Roanoke, VA (US); Lawrence Elwood Murphy, Shorewood, WI (US)

(73) Assignee: General Electric Company, Schenectady, NY (US)

( * ) Notice: Subject to any disclaimer, the term of this patent is extended or adjusted under 35 U.S.C. 154(b) by 72 days.

(21) Appl. No.: 13/023,712

(22) Filed: Feb. 9, 2011

(65) Prior Publication Data

US 2012/0200412 A1 Aug. 9, 2012

(51) Int. Cl.
*G08B 23/00* (2006.01)
(52) U.S. Cl. ......... 340/870.02; 340/870.03; 340/870.05; 340/531; 370/328; 705/412
(58) Field of Classification Search ............. 340/870.01, 340/870.02, 870.03, 870.05, 870.09, 521, 340/531; 705/1, 412, 400, 401; 370/328, 370/329
See application file for complete search history.

(56) References Cited

U.S. PATENT DOCUMENTS

| | | | |
|---|---|---|---|
| 5,699,276 A | 12/1997 | Roos | |
| 5,719,564 A | 2/1998 | Sears | |
| 5,870,140 A * | 2/1999 | Gillberry | ..................... 348/160 |
| 5,923,269 A | 7/1999 | Shuey et al. | |
| 6,088,659 A | 7/2000 | Kelley et al. | |
| 6,838,978 B2 | 1/2005 | Aizu et al. | |
| 6,946,972 B2 | 9/2005 | Mueller et al. | |
| 7,053,770 B2 | 5/2006 | Ratiu et al. | |
| 7,263,073 B2 | 8/2007 | Petite et al. | |
| 7,725,327 B2 | 5/2010 | McGuigan et al. | |
| 2005/0091083 A1 | 4/2005 | McGuigan et al. | |
| 2007/0013547 A1* | 1/2007 | Boaz | ....................... 340/870.02 |
| 2008/0134810 A1 | 6/2008 | Neel et al. | |
| 2008/0177678 A1* | 7/2008 | Di Martini et al. | ........... 705/412 |
| 2010/0156665 A1* | 6/2010 | Krzyzanowski et al. | 340/870.02 |

* cited by examiner

*Primary Examiner* — Hung T. Nguyen
(74) *Attorney, Agent, or Firm* — Ernest Cusick; Hoffman Warnick LLC

(57) ABSTRACT

Systems for monitoring consumer dependency on services are disclosed. In one embodiment, a service dependency notification system includes: at least one computing device adapted to identify a dependency aware device by performing actions comprising: determining whether a service dependency exists; and providing a service dependency status indicator configured to be communicated via a utility network, the service dependency status indicator indicating whether the service dependency exists.

18 Claims, 3 Drawing Sheets

SERVICE DEPENDENCY NOTIFICATION SYSTEM

BACKGROUND OF THE INVENTION

The subject matter disclosed herein relates generally to meter technology, and more particularly, to tools for monitoring consumer dependency upon metered services.

Some utility companies, for example, certain electrical or gas service companies, maintain a database of their consumers who are dependent on their services. These consumers having medical or livelihood conditions which make their well-being dependent upon uninterrupted delivery of service. These databases are used by the utility companies to plan and schedule maintenance related service outages and, in the event of an unplanned loss of service, to prioritize service restoration efforts. However, the development and maintenance of these databases rely upon consumers contacting the utility companies to notify them as to the existence of service dependency at a given meter location and updating the utility company as to a change in service dependency at a given meter location. As a result of this data handoff requirement, the databases do not maintain a real-time accurate record of all consumers who are dependent upon services. This lack of accurate real-time data can lead to planned outages which put service dependent users at risk and responses to unplanned outages which involve an inefficient use of service restoration resources.

BRIEF DESCRIPTION OF THE INVENTION

Systems for monitoring consumer dependency on metered services are disclosed. In one embodiment, a service dependency notification system includes: at least one computing device adapted to identify a dependency aware device by performing actions comprising: determining whether a service dependency exists; and providing a service dependency status indicator configured to be communicated via a utility network, the service dependency status indicator indicating whether the service dependency exists.

A first aspect of the disclosure provides a service dependency notification system including: at least one computing device adapted to identify a dependency aware device by performing actions comprising: determining whether a service dependency exists; and providing a service dependency status indicator configured to be communicated via a utility network, the service dependency status indicator indicating whether the service dependency exists.

A second aspect provides a program product stored on a computer readable medium, which when executed by at least one computing device, performs the following: determines whether a service dependency exists at a dependency aware device; and provides a service dependency status indicator configured to be communicated via a utility network, the service dependency status indicator indicating whether the service dependency exists.

A third aspect provides a dependency aware device comprising: at least one computing device adapted to provide a service dependency status indicator configured to be communicated via a utility network, the service dependency status indicator indicating that a service dependency exists.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
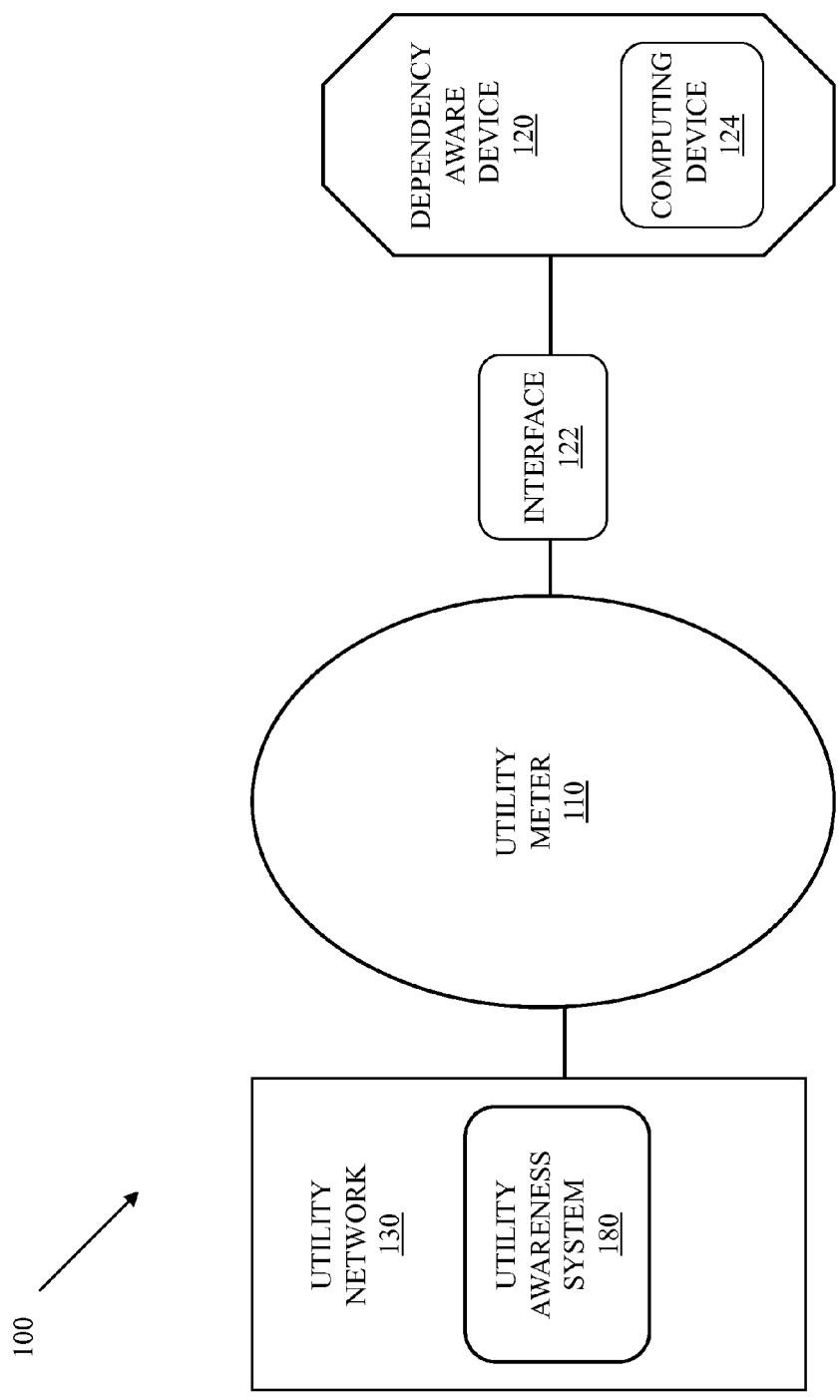
FIG. 1 shows a schematic illustration of a service dependency notification system in accordance with an embodiment of the invention.

As indicated above, aspects of the invention provide for systems configured to monitor consumer dependency on metered services by utilizing a dependency aware device (including but not limited to, e.g. a vital signs monitor, an activity monitor, a metered medication delivery device, a medication storage system, a communication device, a blood treatment device, a smart meter, an oxygen concentrator, a feeder device, a power management unit, an intelligent electronic device, a programmable communicating thermostat, an air conditioning system, a heating system, etc.). The dependency aware device being configured to notify a utility as to the presence of an individual who is dependent upon service and/or to transmit dependency data (including, e.g. the operational status of the dependency aware device, a registration of the dependency aware device as service dependent, the battery life of the dependency aware device, vital signs of the individual, an occupancy at the utility meter/utility meter location, the current environmental conditions at the dependency aware device, the status of need of an individual supported by the dependency aware device etc.) to a utility network via a utility meter. The dependency aware device communicates with the utility meter via a computing device either integrated with or external to the dependency aware device, regularly updating dependency data stored on the utility network and/or supplying the utility network with dependency data in real-time. This provides the utility company with a current and accurate database of the status and/or location of consumers who have a service dependency, i.e. are dependent on metered services. As a result, the utility company is able to safely plan and alert consumers as to scheduled service outages, and to efficiently prioritize restoration efforts in response to an unplanned loss of service.

In the art of metered services and systems (including, e.g., electrical meters, smart meters, power meters, gas meters, etc.), databases of consumers and meter locations which are dependent upon service delivery are often maintained. Typically, consumers register their service dependency and meter locations with the utility, entering themselves into the database and thereby, creating a record alerting the utility as to a critical need for services at their meter location. However, creation and updating of this database is reliant upon either the consumer or the utility contacting the other and notifying them of a change in the dependency status of a meter location. This form of data handoff between the different parties leads to delayed updates, inaccurate databases and wasted resources. Furthermore, this database system does not lend itself well to keeping up with mobile consumers, those who spend time at multiple meter locations. Finally, this lack of up to date data puts consumer wellbeing at risk as planned outages include meter locations supporting undocumented service dependent consumers, and service restoration efforts in response to an unplanned service outage are wasted on restoring service to meter locations which were not supporting a service dependent consumer at the time of the service outage.

In contrast to the conventional system, embodiments of the current invention provide for a dependency aware device which communicates a service dependency status indicator and/or updated dependency data to a utility network via a utility meter, the utility meter providing a secure interface between the dependency aware device and the security of the utility network. The dependency aware device utilizes the security of the utility meter and utility network to provide dependency data updates to the utility company via the communicative connection provided by the utility meter. The indicators and/or updates provided by the dependency aware device enable the utility company to safely plan service outages, keep a current accurate database as to meter locations supporting a service dependent consumer and provide for faster more efficient service restoration efforts in the event of an unplanned service outage.

As will be appreciated by one skilled in the art, the service dependency notification system described herein may be embodied as a system(s), method(s) or computer program product(s), e.g., as part of a utility network monitoring system. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module," "network" or "system." Furthermore, the present invention may take the form of a computer program product embodied in any tangible medium of expression having computer-usable program code embodied in the medium.

Any combination of one or more computer usable or computer readable medium(s) may be utilized. The computer-useable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Turning to the figures, embodiments of a service dependency notification system are shown, where the service dependency notification system may provide a utility company with dependency data, thereby enabling the utility company to safely plan service outages and efficiently prioritize service restoration and rescue efforts in response to an unplanned service outage. Each of the components in the Figures may be connected via conventional means, e.g., via wireless mesh, WiFi, power line communication, cellular, a common conduit or other known means as is indicated in the FIGS. 1-3. Specifically, referring to FIG. 1, a schematic illustration of an embodiment of a service dependency notification system 100 is shown. Service dependency notification system 100 may include a utility meter 110, a dependency aware device 120, an interface 122, a computing device 124, a utility network 130 and a utility awareness system 180. Utility meter 110 may comprise an electrical meter, a water meter, a gas meter, a smart meter or any other form of utility meter as is known in the art. In this embodiment of the invention, utility meter 110 receives communications including dependency data from dependency aware device 120. Utility meter 110 serves as a secure communications link and relays these communications to utility network 130, thereby facilitating communication between dependency aware device 120 and utility network 130 and providing utility network 130 with up to date dependency data.

In an embodiment of the present invention, dependency aware device 120 may utilize an interface 122 (including, e.g. low-power digital radio, power line communication, wireless local area network, etc.) to communicate with utility meter 110. In one embodiment of the invention, computing device 124 is integrated into utility meter 110 to transmit an indicator through utility network 130 indicating that dependency aware device 120 is supported by utility meter 110. In another embodiment of the invention, computing device 124 is integrated into dependency aware device 120 to transmit an indicator through utility network 130 via utility meter 110 indicating that dependency aware device 120 is supported by utility meter 110. In another embodiment of the invention, computing device 124 may obtain dependency data from dependency aware device 120 which may be supported by utility meter 110. Computing device 124 may process the dependency data to determine whether a service dependency exists at utility meter 110 and to provide a service dependency status indicator configured to be communicated to utility network 130 via utility meter 110, the service dependency status indicator indicating whether the service dependency exists at utility meter 110. In another embodiment of the invention, computing device 124 may obtain service supply data about the dependency aware device 120 (including the amount of service, if any dependency aware device 120 is receiving), compare the dependency data with the service supply data to determine if a service supply deficiency exists and provide a service status indicator configured to travel through utility network 130. In another embodiment of the invention, computing device 124 may compare the dependency data with the service supply data to determine a tolerable duration of service outage for dependency aware device 120. In another embodiment of the invention, computing device 124 may provide a priority indicator configured to travel through utility network 130, the priority indicator indicating the tolerable duration of service outage for dependency aware device 120. In another embodiment of the invention, computing device 124 may transmit the dependency data received from dependency aware device 120 to utility network 130 in real-time.

In any event, computing device 124 can comprise any general purpose computing article of manufacture capable of executing computer program code installed by a user (e.g., a personal computer, server, handheld device, etc.). However, it is understood that computing device 124 and dependency aware device 120 are only representative of various possible equivalent computing devices that may perform the various process steps of the disclosure. To this extent, in other embodiments, computing device 124 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Returning to FIG. 1, in an embodiment of the present invention, service dependency notification system 100 may include a utility awareness system 180, utility awareness system 180 stores and processes dependency data received by utility network 130. In one embodiment of the invention, utility awareness system 180 may, based upon comparisons of received dependency data and/or critical situation predictions, prioritize either or both of service restoration efforts and emergency response efforts amongst a plurality of utility meters/utility meter locations. In another embodiment of the invention, utility awareness system 180 may, based upon received dependency data, notify consumers of an upcoming scheduled service outage. In another embodiment of the invention, utility awareness system 180 may, based upon received dependency data, make a critical situation prediction, calculating the tolerable duration of service outage before the conditions at a given consumer dependent meter location become critical (i.e. a device stops working, a consumer's health is put at risk, the temperature drops below or rises above a predetermined level, etc.). In another embodiment of the invention, dependency aware device 120 may make a critical situation prediction, comparing service supply data with dependency data in order to calculate a tolerable duration of service outage before the conditions at the location of dependency aware device 120 become critical and then communicating the critical situation prediction to utility network 130. In another embodiment of the invention, utility network 130 may include an Advanced Metering Infrastructure (AMI).

As previously mentioned and discussed further below, service dependency notification system 100, has the technical effect of enabling computing device 124 to perform, among other things, the monitoring and notification functions described herein. It is understood that some of the various components shown in FIGS. 1-3 can be implemented independently, combined, and/or stored in memory for one or more separate computing devices that are included in computing device 124. Further, it is understood that some of the components and/or functionality may not be implemented, or additional schemas and/or functionality may be included as part of service dependency notification system 100. The service dependency notification system of the present disclosure is not limited to any one particular meter, electrical meter, smart meter, network or other system, and may be used with other power and communication systems. Additionally, the service dependency notification system of the present invention may be used with other systems not described herein that may benefit from the accurate, secure, real-time data communications link provided by the service dependency notification system described herein.

Figure 2:
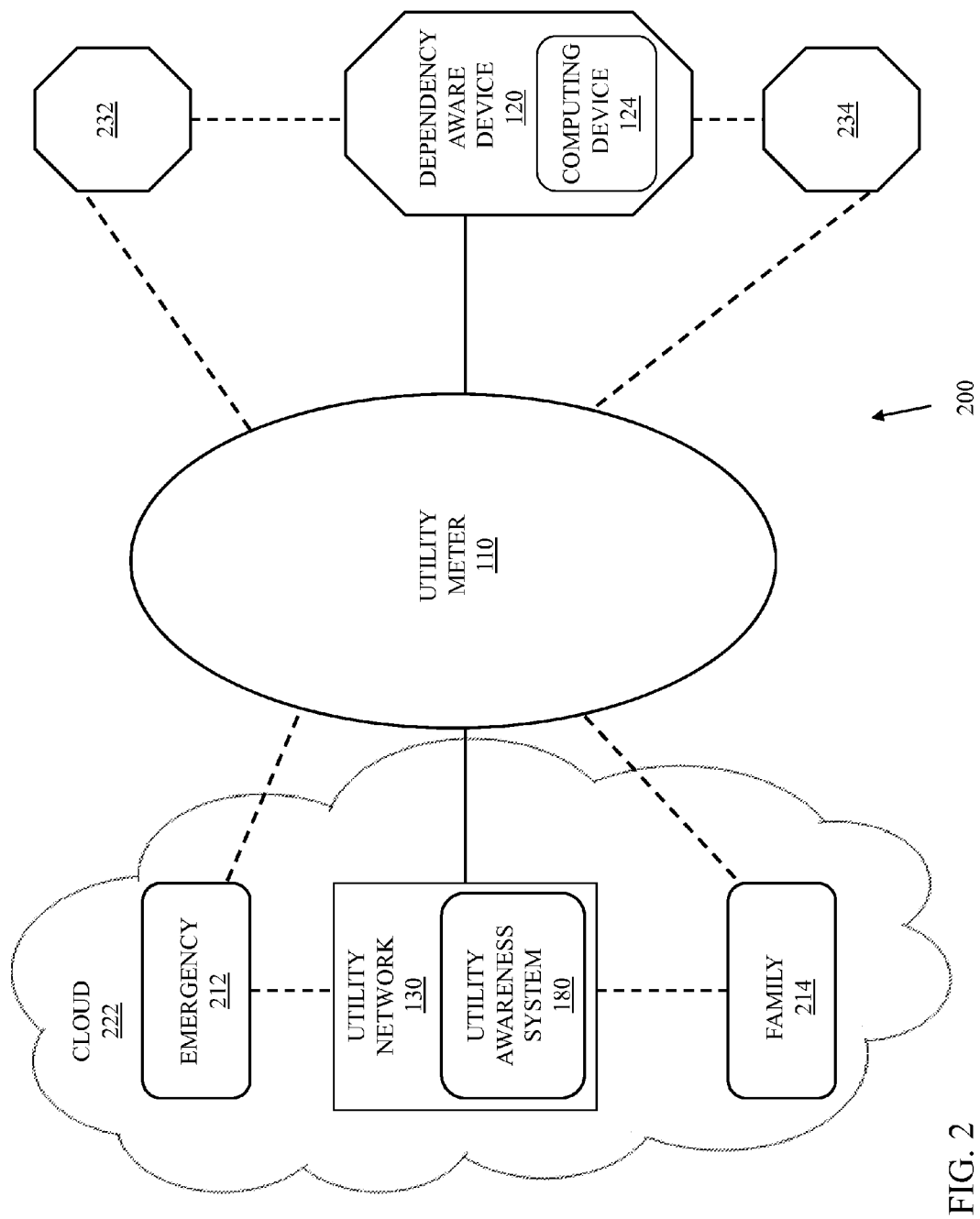
FIG. 2 shows a schematic illustration of a service dependency notification system in accordance with an embodiment of the invention.

Turning to FIG. 2, a schematic illustration of an embodiment of a service dependency notification system 200 including a plurality of dependency aware devices 232, 234 and 120 is shown. It is understood that elements similarly numbered between FIG. 1 and FIG. 2 may be substantially similar as described with reference to FIG. 1. Redundant explanation of these elements has been omitted for clarity. Returning to FIG. 2, in this embodiment, service dependency notification system 200 may include a plurality of dependency aware devices 232, 234 and 120 which may be communicatively connected to utility meter 110. The plurality of dependency aware devices 232, 234 and 120 may communicate dependency data to utility meter 110 independently or cumulatively. In this embodiment, the plurality of dependency aware devices 232, 234 and 120 deliver communications including dependency data to utility meter 110 which securely relays the communications including dependency data to cloud 222. Cloud 222 may include utility network 130, emergency network 212 for initiating and prioritizing emergency responses and family network 214 for notifying family members of a service dependent relative without or at risk of being without service. In one embodiment of the invention, utility network 130 may include a utility awareness system 180 which may communicate a loss of service to either or both of emergency network 212 and family network 214. In another embodiment of the invention, computing device 124 may transmit a service status indicator to either or both of emergency network 212 and family network 214. In another embodiment of the invention, utility meter 110 may communicate a loss of service at a service delivery dependent location to either or both of emergency network 212 and family network 214.

Figure 3:
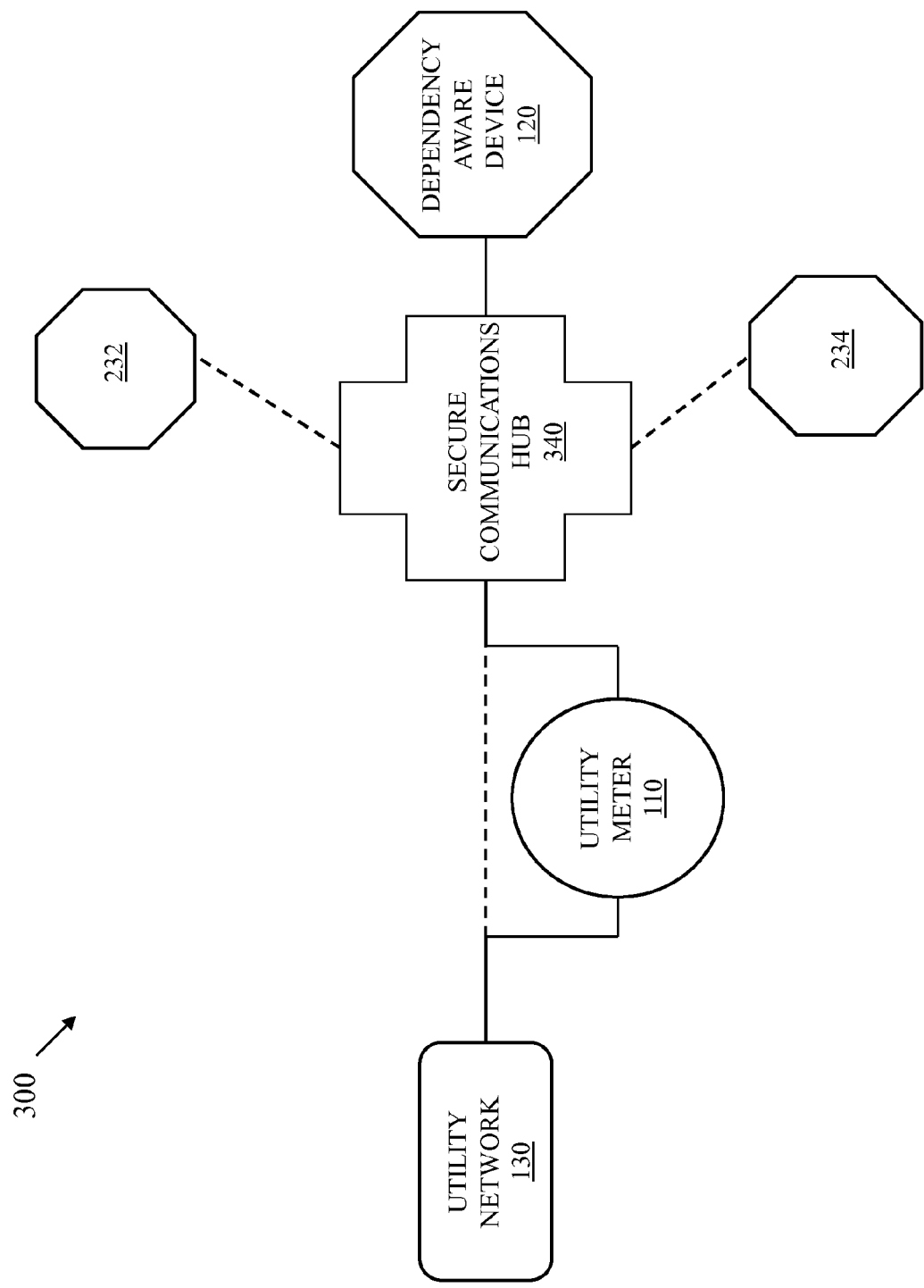
FIG. 3 shows a schematic illustration of a service dependency notification system in accordance with an embodiment of the invention.

Turning to FIG. 3, a schematic illustration of an alternate embodiment of a service dependency notification system 300 is shown having a secure communications hub 340 communicatively connected to utility meter 110 and dependency aware device 120 for relaying secure communications there between. In this embodiment, secure communications hub 340 may be configured as an interface for dependency aware device 120 to securely communicate with utility meter 110, secure communications hub 140 may process, encrypt and exchange communications with utility meter 110 via a secure utility grid. In another embodiment, secure communications hub 340 may be configured as an interface for dependency aware device 120 to securely communicate directly with utility network 130. In another embodiment, secure communications hub 340 may relay communications between utility meter 110 and a plurality of dependency aware devices 120, 232 and 234.

It is understood that as described herein, dependency aware device 120 may include one or more conventional medical or other service dependent devices including but not limited to: a vital signs monitor, an activity monitor, a metered medication delivery device, a medication storage system, a communication device, a blood treatment device, a smart meter, an oxygen concentrator, a feeder device, a power management unit, an intelligent electronic device, a programmable communicating thermostat, an air conditioning system, a heating system.

As discussed herein, various systems and components are described as "obtaining" data (e.g., temperatures, dependency data, the operational status of a dependency aware device, etc.). It is understood that the corresponding data can be obtained using any solution. For example, the corresponding system/component can generate and/or be used to generate the data, retrieve the data from one or more data stores or sensors (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A service dependency notification system comprising:
at least one computing device adapted to monitor a utility supply to a dependency aware device by performing actions including:
determining whether a service dependency exists, wherein the determining includes obtaining dependency data from the dependency aware device;
obtaining service supply data about the dependency aware device;
comparing the dependency data with the service supply data for the dependency aware device to determine whether a service supply deficiency exists; and
providing a service status indicator configured to be communicated via a utility network, the service status indicator indicating whether the service supply deficiency exists.

2. The service dependency notification system of claim 1, wherein the at least one computing device is further configured to transmit dependency data from the dependency aware device to the utility network in real-time.

3. The service dependency notification system of claim 2, wherein the dependency data may be selected from a group consisting of: an operational status of the dependency aware device, a registration of the dependency aware device as service dependent, a battery life of the dependency aware device, a tolerable duration of service outage for the dependency aware device, vital signs of the individual supported by the dependency aware device, an occupancy at a utility meter location, a current environmental condition at the dependency aware device and a status of need of an individual supported by the dependency aware device.

4. The service dependency notification system of claim 1, wherein the at least one computing device is further adapted to send the service status indicator through the utility network to notify an emergency network.

5. The service dependency notification system of claim 1, wherein the at least one computing device is further adapted to send the service status indicator through the utility network to notify a relative.

6. The service dependency notification system of claim 1, wherein the utility network includes a utility awareness system configured to make a critical situation prediction for the dependency aware device, the critical situation prediction determining a tolerable duration of service outage for the dependency aware device.

7. The service dependency notification system of claim 6, wherein the utility awareness system is further configured to prioritize service restoration efforts amongst a plurality of utility meter locations based upon a comparison of the critical situation predictions made for each of the plurality of utility meter locations.

8. The service dependency notification system of claim 6, wherein the utility awareness system is further configured to prioritize emergency efforts amongst a plurality of utility meter locations based upon a comparison of the critical situation predictions made for each of the plurality of utility meter locations.

9. A program product stored on a computer readable storage medium, which when executed by at least one computing device, performs the following:
obtains dependency data from a dependency aware device at a utility meter;
determines whether a service dependency exists at the utility meter based upon the dependency data obtained from the dependency aware device;

obtains service supply data about the dependency aware device at the utility meter;

compares the dependency data with the service supply data for the dependency aware device to determine whether a service supply deficiency exists; and provides a service dependency status indicator configured to be communicated via a utility network, the service dependency status indicator indicating whether the service dependency exists.

10. The program product of claim 9, wherein the dependency data may be selected from a group consisting of: an operational status of the dependency aware device, a registration of the dependency aware device as service dependent, a battery life of the dependency aware device, a tolerable duration of service outage for the dependency aware device, vital signs of the individual supported by the dependency aware device, an occupancy at a utility meter location, a current environmental condition at the dependency aware device and a status of need of the individual supported by the dependency aware device.

11. The program product of claim 9, wherein the at least one computing device is further adapted to transmit dependency data from the dependency aware device to the utility network in real-time.

12. The program product of claim 9, wherein the at least one computing device is further adapted to send the service status indicator through the utility network to notify an emergency network.

13. The program product of claim 9, wherein the comparing of the dependency data with the service supply data includes determining a tolerable duration of service outage for the dependency aware device.

14. The program product of claim 13, wherein the at least one computing device is further adapted to send a priority indicator through the utility network, the priority indicator indicating the tolerable duration of service outage for the dependency aware device.

15. A dependency aware device comprising:
at least one computing device adapted to monitor a utility supply to the dependency aware device by performing actions including:

obtaining service supply data about the dependency aware device;

comparing the service supply data for the dependency aware device with a set of dependency data for the dependency aware device to determine whether a service supply deficiency exists; and providing a service dependency status indicator configured to be communicated via a utility network, the service dependency status indicator indicating that a service dependency exists.

16. The dependency aware device of claim 15, wherein the at least one computing device is further adapted to generate the set of dependency data, the set of dependency data being selected from a group consisting of: an operational status of the dependency aware device, a registration of the dependency aware device as service dependent, a battery life of the dependency aware device, a tolerable duration of service outage for the dependency aware device, vital signs of the individual supported by the dependency aware device, an occupancy at a utility meter location, a current environmental condition at the dependency aware device and a status of need of the individual supported by the dependency aware device.

17. The dependency aware device of claim 16, wherein the at least one computing device is adapted to determine a tolerable duration of service outage by comparing service supply data with the dependency data.

18. The dependency aware device of claim 16, wherein the at least one computing device is further adapted to transmit the dependency data to the utility network in real-time.

* * * * *